United States Patent [19]

Southwick et al.

[11] Patent Number: 5,985,979

[45] Date of Patent: Nov. 16, 1999

[54] PROCESS FOR MAKING STABLE LATEXES OF BLOCK COPOLYMERS

[75] Inventors: Jeffrey George Southwick, Houston; David Michael Austgen, Jr., Missouri City, both of Tex.

[73] Assignee: Shell Oil Company, Houston, Tex.

[21] Appl. No.: 08/094,591

[22] Filed: Jul. 20, 1993

[51] Int. Cl.$^6$ ..................................................... C08L 51/00
[52] U.S. Cl. ........................................................... 524/505
[58] Field of Search ............................................. 524/505

[56] References Cited

U.S. PATENT DOCUMENTS

| | | |
|---|---|---|
| 2,918,391 | 12/1959 | Hornibrook . |
| 3,432,455 | 3/1969 | Rasicci . |
| 3,480,578 | 11/1969 | Witt . |
| 3,506,604 | 4/1970 | Benjamin . |
| 3,513,120 | 5/1970 | Pohlemann . |
| 3,962,197 | 6/1976 | Khanna . |
| 4,001,159 | 1/1977 | Imai et al. . |
| 4,061,833 | 12/1977 | Pelletier et al. . |
| 4,199,490 | 4/1980 | Kamiya et al. . |
| 4,252,852 | 2/1981 | Goth . |
| 4,522,972 | 6/1985 | Mondt et al. . |
| 4,622,358 | 11/1986 | Pennewiss et al. ..................... 524/505 |
| 4,871,797 | 10/1989 | Buter ........................................ 524/505 |
| 4,912,184 | 3/1990 | Akasaki et al. . |
| 4,937,282 | 6/1990 | Pfoehler et al. . |
| 5,120,765 | 6/1992 | Southwick et al. ..................... 524/505 |
| 5,212,220 | 5/1993 | Gelles . |
| 5,292,795 | 3/1994 | Southwick et al. . |

FOREIGN PATENT DOCUMENTS

| | | |
|---|---|---|
| 749266 | 10/1970 | Belgium . |
| 151456 | 10/1981 | Germany . |
| 54-148831 | 11/1979 | Japan . |
| 56-115345 | 9/1981 | Japan . |
| 475367 | 11/1976 | U.S.S.R. . |
| 90/15102 | 12/1990 | WIPO . |

*Primary Examiner*—Kriellion Sanders
*Attorney, Agent, or Firm*—Donald F. Haas

[57] ABSTRACT

This invention is a process for producing stable polymer emulsions and latexes. The polymers are block copolymers of conjugated dienes and vinyl aromatic hydrocarbons. The process comprises making a solution of the polymer, adding another block copolymer as a stabilizing agent, emulsifying the polymer solution by mixing it with an aqueous phase and removing the solvent, cosolvent and excess water. The stabilizing block polymer contains an acrylic block in addition to at least one vinyl aromatic hydrocarbon and/or a conjugated diene block.

12 Claims, No Drawings

PROCESS FOR MAKING STABLE LATEXES OF BLOCK COPOLYMERS

BACKGROUND OF THE INVENTION

This invention relates to the production of fine stable latexes of block copolymers of vinyl aromatic hydrocarbons and conjugated dienes. More specifically, it relates to the production of such latexes which are stabilized with a non-migrating acrylic block polymer stabilizer.

It is known that a block copolymer can be obtained by an anionic copolymerization of a conjugated diene compound and an alkenyl arene compound by using an organic alkali metal initiator. Block copolymers have been produced which comprise blocks of these different monomers such as configurations which are linear, radial or star, i.e. many arms radiating from a central core. The proportion of thermoplastic blocks to elastomeric blocks and the relative molecular weights of each of these blocks is balanced to obtain a rubber having unique performance characteristics.

It has been found advantageous to prepare latexes of these polymers in order to obtain products that can be formulated into coatings and adhesives without the need for organic solvents. In some cases, small amounts of organic solvents are preferred to control evaporation of water or to serve as coalescing aids. But the quantity of organic solvent needed to control evaporation or aid coalescence will be much less than that needed to make corresponding coatings and adhesive films from organic solvent solutions (solvent-borne coatings and adhesives). Therefore, these latexes are comprised of the polymer, surfactants, coalescing solvents and water.

Preparation of such latexes is well known to those skilled in the art (see U.S. Pat. Nos. 3,360,599, 3,238,173 and 3,726,824). Latexes of polyvinyl aromatic-polydiene block copolymers are conventionally made by (1) dissolving the block copolymer in an organic solvent or solvents to form a polymer cement, (2) emulsifying the polymer cement in an aqueous solution containing one or more surfactants, and (3) stripping the emulsion of organic and excess aqueous liquids to form a stable, suitably concentrated latex. Polymer cements are often available directly from the polymerization reactor. Surfactants are usually present such that the total concentration of surfactants ranges from about 0.2 to more than 20 parts per hundred rubber (phr), where the rubber is the block copolymer. Such surfactants may be low molecular weight conventional surfactants including anionic, cationic, and nonionic surfactants or they may be polymeric surfactants having one or more water soluble blocks. Low levels of organic solvents are often left in the latex and/or other solvents are added following latex concentration as aids to control evaporation of water or aid coalescence and film formation after application. Therefore, conventional latexes of block copolymers are usually comprised of polymer, surfactants, organic solvents, and water.

Surfactants are capable of migrating through the polymer matrix during film formation since they are not irreversibly anchored in any one location. Therefore, high surfactant concentration can negatively impact adhesive properties of adhesives and lead to moisture ingress in coatings. Those interested in water-based emulsion adhesives and coatings have attempted to solve this problem by using less surfactant but some surfactant must be used in order to form the emulsion. Thus, it would be highly advantageous to be able to make a block copolymer emulsion and latex with a non-migrating stabilizer.

In some cases, fine polymer cement emulsions are necessary in order to make fine latexes. The present invention can produce fine emulsions using a non-migrating polymeric stabilizer. It is also known that small (submicron) particle sizes in latexes can enhance coating and adhesive film coalescence. Thus, it is highly advantageous to be able to produce a stable polymer cement emulsion with an average drop size of less than one micron.

SUMMARY OF THE INVENTION

This invention provides a process for producing stable polymer latexes using a non-migrating polymeric stabilizer. First, a polymer cement comprising up to 30 weight percent of a block copolymer of a conjugated diene and a vinyl aromatic hydrocarbon in a base solvent is made. The base solvent is hereafter referred to as the solvent and is capable of dissolving the block copolymer.

Instead of using a low molecular weight surfactant, from 0.5 to 20 weight percent of an acrylic block polymer is mixed with the polymer cement or the aqueous solution which is to be emulsified. This block polymer is a block copolymer of a vinyl aromatic hydrocarbon, preferably styrene, and/or a conjugated diene and at least one acrylic monomer which is an acid, salt of an acid or anhydride derivative of a monomer with the structure

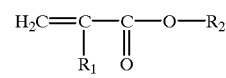

where $R_1$ is hydrogen, phenyl or an alkyl radical which is linear or branched and has from 1 to 10 carbon atoms and $R_2$ is an alkyl radical. These block polymers contain, in the polymer backbone, acrylic, polar, and especially methacrylic acid, functionality. This provides the polymer with strongly reactive and interactive chemical groups. It is preferred that the acrylic block be comprised of acrylic acid units, preferably methacrylic acid or salts or anhydrides thereof. These acrylic block copolymers have the ability to reduce polymer cement-water interfacial tension and stabilize polymer cement-in-water emulsions, thereby forming small particle size latexes upon the removal of solvent. Hence, there is no need for conventional low molecular weight surfactant.

The cement is then emulsified in an aqueous solution which need not contain a conventional surfactant. The ratio of aqueous phase to cement can range from 10:1 to 1:3, preferably 2:1 to 1:2. Finally, the solvent is stripped from the emulsion using conventional techniques. Excess water can be removed simultaneously or sequentially with the organic solvent to concentrate the latex.

DETAILED DESCRIPTION OF THE INVENTION

As is well known, polymers containing both aromatic and ethylenic unsaturation can be prepared by copolymerizing one or more polyolefins, particularly a diolefin, in this case butadiene and isoprene, with one or more alkenyl aromatic hydrocarbon monomers, in this case styrene. Other diolefins such as 2,3-dimethyl-1,2-butadiene, 1,3-pentadiene, 1,3-hexadiene and the like, and other vinyl aromatic hydrocarbons such as o-methylstyrene, p-methyl styrene, p-tertbutylstyrene, 1,3-dimethylstyrene, alphamethylstyrene, vinylnaphthalene, vinylanthracene and the like may be used.

Polymers containing ethylenic unsaturation or both aromatic and ethylenic unsaturation may be prepared using free-radical, cationic and anionic initiators or polymerization catalysts. Such polymers may be prepared using bulk, solution or emulsion techniques. In any case, the polymer containing at least ethylenic unsaturation will, generally, be recovered as a solid such as a crumb, a powder, a pellet or the like. Polymers containing ethylenic unsaturation and polymers containing both aromatic and ethylenic unsaturation are, of course, available commercially from several suppliers.

Polymers of conjugated diolefins and copolymers of one or more conjugated diolefins and one or more alkenyl aromatic hydrocarbon monomers such as ABA block copolymers are frequently prepared in solution using anionic polymerization techniques. In general, when solution anionic techniques are used, these block copolymers are prepared by contacting the monomers to be polymerized simultaneously or sequentially with an organoalkali metal compound in a suitable solvent at a temperature within the range from about −150° C. to about 300° C., preferably at a temperature within the range from about 0° C. to about 100° C. Particularly effective anionic polymerization initiators are organolithium compounds having the general formula:

$$RLi_n$$

Wherein:
R is an aliphatic, cycloaliphatic, aromatic or alkyl-substituted aromatic hydrocarbon radical having from 1 to about 20 carbon atoms; and n is an integer of 1 to 4.

In general, many of the solvents known in the prior art to be useful in the preparation of such polymers may be used as the base solvent in cement. Suitable solvents, then, include straight- and branched-chain hydrocarbons such as pentane, hexane, heptane, octane and the like, as well as, alkyl-substituted derivatives thereof; cycloaliphatic hydrocarbons such as cyclopentane, cyclohexane, cycloheptane and the like, as well as, alkyl-substituted derivatives thereof; aromatic and alkyl-substituted aromatic hydrocarbons such as benzene, naphthalene, toluene, xylene, and the like; hydrogenated aromatic hydrocarbons, such as tetralin, decalin and the like.

The block copolymers may be produced by any well known block polymerization or copolymerization procedures including the well known sequential addition of monomer techniques, incremental addition of monomer technique or coupling technique as illustrated in, for example, U.S. Pat. Nos. 3,251,905, 3,390,207, 3,598,887 and 4,219,627 which are herein incorporated by reference. As is well known in the block copolymer art, tapered copolymer blocks can be incorporated in the multiblock copolymer by copolymerizing a mixture of conjugated diene and vinyl aromatic hydrocarbon monomers utilizing the difference in their copolymerization reactivity rates. Various patents describe the appropriation of multiblock copolymers containing tapered copolymer blocks including U.S. Pat. Nos. 3,251,905, 3,265,765, 3,639,521, and 4,208,356 which are herein incorporated by reference. If desired, these block copolymers can be hydrogenated. Hydrogenation may be effected selectively as disclosed in U.S. Pat. No. Reissue 27,145 which is herein incorporated by reference. The hydrogenation of these polymers and copolymers may be carried out by a variety of well established processes including hydrogenation in the presence of such catalysts as Raney Nickel, noble metals such as platinum and the like, soluble transition metal catalysts and titanium catalysts as in U.S. Pat. No. 5,039,755, which is also incorporated by reference.

The block copolymer stabilizers which may be used according to the present invention are block copolymers of conjugated dienes and/or vinyl aromatic hydrocarbons and derivatized acrylic monomers of the formula described above such as acrylic acids, salts of acrylic acids, or derivatives of alkyl methacrylates such as hydrolyzed alkyl methacrylates or anhydride derivatives thereof. They must be derivatized to acids, salts or anhydrides.

The acrylic block copolymers may be produced by any well known block polymerization or copolymerization procedures. The manufacture of such polymers containing alkyl methacrylates is described in U.S. Pat. No. 5,002,676 and copending commonly assigned application Ser. No. 525,812, filed May 21, 1990, both of which are herein incorporated by reference.

The acrylic block copolymers of the present invention which are used as polymeric stabilizers are block copolymers that contain at least one terminal block of an acrylic monomer. They must also contain at least one other block of a vinyl aromatic hydrocarbon and/or a conjugated diene. The acrylic block copolymer may contain one or more blocks each of a vinyl aromatic hydrocarbon and a conjugated diene. The preferred acrylic block copolymer is a diblock which contains a vinyl aromatic hydrocarbon block and an acrylic block because the vinyl aromatic hydrocarbon block fuses into vinyl aromatic domains in the thermoplastic rubber particles. Acrylic block copolymer structures which are specifically included herein (where S is styrene, D is a conjugated diene and M is an acrylic monomer) are as follows:

D-M, S-M (the preferred block polymer), S-D-M, D-S-M, M-S-M, M-D-M, etc.

There must be a terminal acrylic block to provide sufficient polarity so that the block copolymer will diffuse to the cement/water interface. It is very important that there be at least one other block, a vinyl aromatic hydrocarbon block or a conjugated diene block. During emulsification the vinyl aromatic hydrocarbon and/or conjugated diene blocks will remain in the cement phase while the acrylic blocks will partition to the aqueous phase. During solvent removal, the vinyl aromatic and/or conjugated diene blocks will associate with the vinyl aromatic hydrocarbon domains and/or the conjugated diene domains (respectively) of the dispersed thermoplastic rubber. Thus, these acrylic block copolymers become irreversibly anchored into the dispersed thermoplastic rubber particles so that they cannot desorb from the particles as surfactants can. This provides one of the most important advantages of the present invention, i.e., that the acrylic monomer block polymers are well anchored in the latex which is ultimately formed and used as a coating, adhesive, or otherwise.

Vinyl aromatic hydrocarbons which may be utilized to prepare these polymeric stabilizers include styrene, o-methylstyrene, p-methylstyrene, p-tert-butylstyrene, 2,4-dimethylstyrene, alpha-methyl styrene, vinylnapthalene, vinylanthracene and the like. The preferred vinyl aromatic hydrocarbon is styrene. Conjugated dienes or diolefins which can be used herein include butadiene and isoprene as well as other dienes including 2,3-dimethyl-1,2-butadiene, 1,3-pentadiene, 1-3,-hexadiene and the like.

Alkyl methacrylates are one preferred group for use in preparing polymeric surfactants. Those employed herein include methacrylates wherein the alkyl group has up to 14 carbon atoms. Illustrative of such methacrylate esters are methyl methacrylate, ethyl methacrylate, sec-butyl methacrylate, t-butyl methacrylate, i-amyl methacrylate, hexyl methacrylate, decyl methacrylate and dodecyl methacrylate. Largely because of ease of polymerization, the preferred alkyl methacrylates are branched-butyl methacrylates, i.e., iso-butyl methacrylate and t-butyl methacrylate. The desired poly(alkyl methacrylate) block is produced by directly polymerizing the corresponding alkyl methacrylate monomer or alternatively the desired block is obtained by polymerizing a more easily polymerizable methacrylate and subsequently transesterifying the product to introduce the desired alkyl group. Tertiary butyl methacrylate (TBMA) is preferred because of ease of purification and polymerization, and because it undergoes thermolysis at temperatures as low as about 180° C.

In order to be useful herein, the acrylic units of the acrylic polymer block must be converted from the ester form to an acid, salt thereof or anhydride. This is necessary because an ionizable polar group is necessary for the molecule to provide effective stabilization of the dispersed particles. Ionized acids effectively stabilize dispersed particles in water by increasing surface charge resulting in repulsive particle-particle interactions. Methacrylic acid is the preferred derivative because it can be ionized in water to the methacrylic acid salt in the presence of base.

The ester is converted into an anhydride by thermolysis, i.e., heating to a temperature in excess of 180° C., preferably 220° C. to 260° C. Anhydrides are readily converted to the acid form in the presence of water.

The molecular weights of these polymers may range from 500 to 25,000, preferably from 4,000 to 15,000. The vinyl aromatic hydrocarbon block molecular weight generally ranges from 2,000 to 15,000 and the molecular weight of the acrylic monomer block should be in the range from 200 to 10,000. The molecular weights of the blocks must be adjusted or the pH of the aqueous phase altered so that the proper solubility balance (hydrophilic/lipophilic balance) exists between the two blocks so that the molecule will adsorb at the cement-water interface. This concept of solubility balance is routinely used with low molecular weight surfactants. The styrene block must be large enough to firmly anchor the block polymer to the dispersed polymer particle. The molecular weights are gel permeation chromatography peak molecular weights of the main species.

The acrylic content of the polymer is generally no more than about 40% but acrylic contents of up to 75% are possible. Generally, the acrylic monomer may be present in the polymer in an amount from about 1% to about 25% because these polymers have been shown to provide effective stabilization. All percentages expressed above are weight percentages based on the total weight of the acrylic-containing block polymer.

The polymer cement containing from 0.5 to 20 percent by weight of at least one acrylic block polymer as a stabilizing agent is emulsified in an aqueous phase. This stabilizing agent is unique in that one block of the molecule (for example a styrene block or an isoprene block) serves to anchor the molecule into either the styrene phase or the isoprene phase of the dispersed particle. The acid salt block of the acrylic block copolymer is oriented at the particle-aqueous interface and prevents droplet coagulation and coalescence due to resulting repulsive electrostatic interactions between neighboring droplets. The acrylic block polymer then functions as an ionic surfactant which is bound to the dispersed particle. This is an advantage compared to conventional ionic surfactants that provide electrostatic stabilization, but are not bound in that conventional low molecular weight surfactants freely migrate to the surface when films are cast from dispersed systems. Surfactant build-up at surfaces can ruin the adhesion properties of the film, and can reduce the barrier properties of the film to water.

The amount of acrylic block polymer required for stabilization depends on the characteristics of the diblock. If less than 0.5 weight % based on total dispersed tri-block polymer is used, then insufficient diblock may be present to stabilize the emulsion. More than 20% based on total block copolymer is usually not necessary and is undesirable because at that level the physical properties of films formed from the dispersed tri-block polymer will be altered.

Emulsions can be prepared by contacting the aqueous solution and the polymer cement under conditions of high shear. Typical emulsification equipment includes the following: sonic horn, colloid mill, homogenizer, liquid whistle and high shear mixer.

The process of the present invention may be combined with the process of our U.S. application Ser. No. 880,796, filed May 8, 1992 which is herein incorporated by reference. This process utilizes a cosolvent, such as methyl ethyl ketone, to improve the emulsions and latexes made with these polymers. Other cosolvents described therein include benzene, toluene, styrene, xylenes, ethyl acetate, tetrahydrofuran, diethyl ketone, n-propyl acetate, diethylene glycol monoethyl ether, dipropylene glycol monomethyl ether, cyclohexanone, and diacetone alcohol.

It is preferred, although not necessary, that the acrylic block polymer is dispersed or dissolved into the polymer cement and the cement is emulsified by addition to a known volume of water which is agitated using a suitable emulsification device, especially a high speed mixer. This procedure promotes the efficient preparation of cement-in-water emulsions with small average drop sizes. Another preferred element of the process is that the minimal acrylic monomer block polymer level consistent with stable emulsions and latexes is used because high levels can possibly impair the ultimate product performance of the latex in that films formed from the latex may be too hard and the tack may be insufficient. The final emulsion may contain up to 75 weight percent of the cement as the dispersed phase. This is an aqueous phase to cement ratio of 1:3.

The solvent is removed from the emulsion by standard flashing or stripping techniques. The temperature of stripping can range from 25 to 100° C. and the stripping pressure can range from 760 down to 10 millimeters of mercury. It is preferred to flash solvent by reducing the pressure on the emulsion and increasing the emulsion temperature moderately. Excess water may be removed at the same time or later in order to concentrate the resulting latex to the desired percent solids. Alternately, the latex can be concentrated using conventional centrifugation techniques or by creaming. Sufficient water is removed to concentrate the latex to from 15 weight percent polymer to 70 weight percent polymer.

The process of the present invention produced block copolymer latexes which are very stable and very fine, i.e., have average particle sizes of less than one micron. Such polymer latexes are useful for producing water-borne coatings containing little or no solvent, and formulating into water-based adhesives including pressure sensitive adhesives, contact adhesives, construction mastic adhesives, and laminating adhesives.

EXAMPLE 1

A hydrogenated styrene-butadiene-styrene triblock copolymer having a molecular weight of 49000 (7000-35000-7000) was dissolved in an 80:20 blend of cyclohexane and methyl ethyl ketone such that the polymer content was 20% w. 50.0 grams of this polymer cement were added incrementally to 50 g of distilled water. No surfactant was present in the aqueous phase. Between cement additions, the mixture was subjected to ultrasound for 20 to 30 seconds using a Branson Sonifier Model 450. The cement was added in a total of five approximately 10 ml additions. The ultrasound effected cavitation causing intense mixing to occur. An undesirable effect of this mixing was that a water-in-cement emulsion formed. However, after all cement was added, the water-in-cement quickly phase separated into an aqueous phase and a polymer cement phase. Hence, in the absence of surfactant a water-in-cement emulsion is favored while a cement-in-water emulsion is desired. Moreover, the emulsion is unstable.

EXAMPLE 2

A polymer cement such as that described in Example 1 was prepared. 50.0 grams of this polymer cement were added incrementally to 50.0 g of an aqueous solution containing 0.1% w sodium dodecyl sulfate, an anionic surfactant. This surfactant concentration is equivalent to 0.5 parts per hundred rubber ("rubber" refers to the base polymer). No polystyrene-polymethacrylic acid diblock copolymer was added to this mixture. Between additions, the mixture was subjected to ultrasound causing the formation of a cement-in-water emulsion with a mean drop size of 0.42 microns. Solvent was subsequently removed in a rotary evaporator leaving a polymer latex with mean average drop size of 0.50 microns. The total solids content was determined gravimetrically to be 16.1% wt. The latex was allowed to sit in a quiescent state for 30 days. Following this period, the latex was filtered through a 100 mesh screen resulting in the removal of a significant amount of coagulum. The percent solids of the latex filtrate was 14.9% w indicating that more than seven percent of the latex was removed as coagulum.

EXAMPLE 3

A hydrogenated styrene-butadiene-styrene triblock copolymer having a molecular weight of 49000 (7000-35000-7000) was dissolved in a 60:40 mixture of cyclohexane and methyl ethyl ketone. A styrene-methacrylic acid diblock copolymer having a molecular weight of 12300 (12000-300) was added to this polymer cement such that the triblock to diblock ratio was 9:1 ratio. The final polymer content of the cement was 20.0% w. 50.0 g of this polymer cement were added incrementally to 50 g of an aqueous solution containing 0.015 g of sodium hydroxide. No surfactant was present in the aqueous phase. Between cement additions the mixture was subjected to ultrasound cavitation causing emulsification of the cement in the aqueous phase. The mean drop size of the cement emulsion after sonication was measured by dynamic light scattering to be 0.43 microns.

The emulsion was allowed to remain in a quiescent state for 24 hours. The drop size distribution was then remeasured. The mean drop size had increased to 0.51 microns due to drop coagulation and drop coalescence. Subsequently, solvent and excess water were removed from the emulsion in a rotary evaporator. The mean particle size of the resulting latex was determined by light scattering to be 0.58 microns. This latex was allowed to remain in a quiescent state for 75 days. During this period no measurable coagulum formed (solids that will not pass through 100 mesh screen) indicating that gross coagulation did not occur. However, the particle drop size was observed to increase to 0.99 microns which is indicative of the formation of clusters of doublets and triplets, etc.

EXAMPLE 4

The process described in Example 3 was repeated, except that 0.05 g of sodium dodecyl sulfate (0.1% w or 0.5 parts per rubber) and 0.08 g of sodium hydroxide were added to the aqueous phase before ultrasonic mixing. The 12,000-300 molecular weight styrene-methacrylic acid di-block copolymer was again used. The emulsion drop size was measured to be 0.53 microns. Following solvent removal, the latex particle size was determined to be 0.53 microns. The latex was allowed to remain in a quiescent state for 30 days. During this period, no measurable coagulum formed but the mean particle size increased to 0.74 microns.

EXAMPLE 5

A hydrogenated styrene-butadiene-styrene triblock copolymer such as that described in Example 1 was dissolved in a 60-30-10 blend of cyclohexane, methyl ethyl ketone, and isopropyl alcohol to give a cement containing 19.5% w polymer. 0.5 g of a polystyrene-polymethacrylic acid diblock having block molecular weights of about 2000 and 1200 respectively were added to the cement. The final polymer concentration was 20% w. 50 g of this cement were then added incrementally to 50.0 g of an aqueous solution containing 0.12 g of 30% ammonium hydroxide and 0.1%w sodium dodecyl sulfate. Between cement additions the mixture was subjected to ultrasonic mixing for about 20 seconds. A total of five cement additions were made.

Ultrasonic mixing effected the formation of a cement-in-water emulsion having an initial mean drop size of 0.63 microns. Solvent and excess water were then removed from the cement emulsion using a rotary evaporator. The resulting latex had a particle size of 0.53 microns. The latex was allowed to remain in a quiescent state for 30 days. During this period the intensity mean particle size increased only marginally to 0.62 microns indicating that the latex was stable to particle coagulation.

Comparing Examples 4 and 5 with Example 2 suggests that 0.5 phr of sodium dodecyl sulfate is an insufficient amount to stabilize block copolymer latexes. Adding acrylic containing block copolymer stabilizer along with this amount of low molecular weight surfactant produces stable systems.

We claim:

1. A process for producing stable polymer latexes with a non-migrating polymeric stabilizer which comprises:

(a) making a polymer cement of a block copolymer of a conjugated diene and a vinyl aromatic hydrocarbon and a solvent for the block copolymer;

(b) providing an aqueous phase;

(c) adding to the polymer cement or to the aqueous phase from 0.5% to 20% by weight of a block polymer of a vinyl aromatic hydrocarbon and/or a conjugated diene and an acrylic monomer which is an acid, salt or anhydride derivative of a monomer with the structure

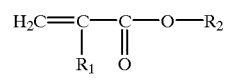

where $R_1$ is selected from the group consisting of hydrogen, phenyl and alkyl radicals which are linear or branched and contain from 1 to 10 carbon atoms, and $R_2$ is an alkyl radical;

(d) emulsifying the polymer cement with the aqueous phase at an aqueous phase to cement ratio of from 10:1 to 1:3; and (e) removing solvent, cosolvent and excess water from the emulsion.

2. The process of claim 1 wherein the acrylic monomer block polymer is a styrene-methacrylic acid diblock.

3. The process of claim 1 wherein a cosolvent is used.

4. The process of claim 3 wherein the cosolvent is selected from the group consisting of benzene, toluene, styrene, xylenes, methyl ethyl ketone, ethyl acetate, tetrahydrofuran, diethyl ketone, n-propyl acetate, diethylene glycol monoethyl ether, dipropylene glycol monomethyl ether, cyclohexanone, and diacetone alcohol.

5. The process of claim 1 wherein the aqueous phase to cement ratio is from 2:1 to 1:2.

6. A process for producing stable polymer emulsions with non-migrating polymeric stabilizer which comprises:

(a) making a polymer cement of a block copolymer of a conjugated diene and a vinyl aromatic hydrocarbon and a solvent for the block copolymer;

(b) providing an aqueous phase;

(c) adding to the polymer cement or the aqueous phase from 0.5% to 20% by weight of a block polymer of a vinyl aromatic hydrocarbon and/or a conjugated diene and an acrylic monomer which is an acid, salt or anhydride derivative of a monomer with the structure

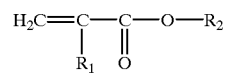

where $R_1$ is selected from the group consisting of hydrogen, phenyl and alkyl radicals which are linear or branched and contain from 1 to 10 carbon atoms, and $R_2$ is an alkyl radical;

(d) emulsifying the polymer cement with the aqueous phase at an aqueous phase to cement ratio of from 10:1 to 1:3.

7. The process of claim 6 wherein the acrylic monomer block polymer is a styrene-methacrylic acid diblock.

8. The process of claim 6 wherein a cosolvent is used.

9. The process of claim 8 wherein the cosolvent is selected from the group consisting of benzene, toluene, styrene, xylenes, methyl ethyl ketone, ethyl acetate, tetrahydrofuran, diethyl ketone, n-propyl acetate, diethylene glycol monoethyl ether, dipropylene glycol monomethyl ether, cyclohexanone, and diacetone alcohol.

10. The process of claim 6 wherein the aqueous phase to cement ratio is from 2:1 to 1:2.

11. The product of the process of claim 1.

12. The product of the process of claim 6.

* * * * *